(12) United States Patent
Seeno et al.

(10) Patent No.: US 7,021,247 B1
(45) Date of Patent: Apr. 4, 2006

(54) ORNAMENTAL BEHAVIORAL MODIFICATION RECEPTACLE COLLAR

(76) Inventors: Eva Marie Seeno, 80 Sweetgum La., Miller Place, NY (US) 11764; Michael Goldfarb, 80 Sweetgum La., Miller Place, NY (US) 11764

( * ) Notice: Subject to any disclaimer, the term of this patent is extended or adjusted under 35 U.S.C. 154(b) by 0 days.

(21) Appl. No.: 10/919,185

(22) Filed: Aug. 16, 2004

(51) Int. Cl.
*A01K 27/00* (2006.01)
(52) U.S. Cl. .................................................. 119/859
(58) Field of Classification Search .............. 119/792, 119/719, 856, 858, 859, 862, 863
See application file for complete search history.

(56) References Cited

U.S. PATENT DOCUMENTS

| | | | |
|---|---|---|---|
| 1,129,093 A | 2/1915 | Hiatt | |
| 1,508,601 A | 9/1924 | Huff | |
| 2,187,021 A | 1/1940 | Everson | |
| 3,096,741 A | 7/1963 | Ollstein | |
| 3,874,339 A | 4/1975 | Coulbourn | |
| 4,091,766 A | 5/1978 | Colliard | |
| 4,321,891 A | 3/1982 | Moeller | |
| 4,335,682 A * | 6/1982 | Gonda et al. | 119/719 |
| 4,539,937 A | 9/1985 | Workman | |
| 4,787,340 A | 11/1988 | Kirtley | |
| 5,161,485 A * | 11/1992 | McDade | 119/859 |
| 5,207,178 A * | 5/1993 | McDade et al. | 119/859 |
| 5,353,744 A * | 10/1994 | Custer | 119/719 |
| 5,467,743 A | 11/1995 | Doose | |
| 6,135,060 A * | 10/2000 | So | 119/720 |
| 6,167,843 B1 * | 1/2001 | Kim | 119/720 |
| 6,269,777 B1 * | 8/2001 | Prusia et al. | 119/792 |
| 6,289,903 B1 * | 9/2001 | Haufler | 132/275 |
| 6,439,167 B1 | 8/2002 | Keller | |
| 6,474,269 B1 * | 11/2002 | So | 119/720 |
| 6,748,903 B1 * | 6/2004 | Price et al. | 119/858 |
| 6,769,235 B1 * | 8/2004 | Hayes | 54/71 |
| 2002/0069835 A1 | 6/2002 | Strahm | |

* cited by examiner

*Primary Examiner*—Son T. Nguyen
(74) *Attorney, Agent, or Firm*—Michael I Kroll

(57) ABSTRACT

An apparatus for a collar 12 incorporating various decorative elements used to personalize the collar having means for mounting a behavioral modification apparatus 22 thereto. The collar 12 has at least one aperture 30 for the passage therethrough of the behavioral modification electrode(s) 26 along with means for releasably securing the behavioral apparatus whereby the user can vary or replace the collar. While the collar 12 is designed to incorporate a receptacle for known behavioral modification apparatuses 22, it can also be used for various other products without departing from the concept of providing a receptacle 14 for the placement therein of a behavioral modification apparatus, the receptacle forming an integral part of a strap 12 having one of a mating closure member 18 positioned on each distal end and a ring-like fastener 16 for mounting accessory elements usually associated with pets such as license, identification and contact information.

4 Claims, 8 Drawing Sheets

ORNAMENTAL BEHAVIORAL MODIFICATION RECEPTACLE COLLAR

BACKGROUND OF THE INVENTION

1. Field of the Invention

The present invention relates generally to collars and, more specifically, to behavioral modification apparatus mounted on a pet collar.

The present invention is a collar incorporating various decorative elements used to personalize the collar having means for mounting a behavioral modification apparatus thereto. The collar has at least one aperture for the passage therethrough of the behavioral modification electrode(s) along with means for releasably securing the behavioral apparatus whereby the user can vary or replace the collar.

While the collar is designed to incorporate a receptacle for known behavioral modification apparatus, it can also be used for various other manufacturers without departing from the concept of providing a receptacle for the placement therein of a behavioral modification apparatus with apertures for the positioning of electrodes, said receptacle forming an integral part of a strap having one of a mating closure member positioned on each distal end and a ring-like fastener for mounting accessory elements usually associated with pets such as license, identification and contact information.

2. Description of the Prior Art

There are other decorative collars designed with receptacles. Typical of these is U.S. Pat. No. 1,129,093 issued to Hiatt on Feb. 23, 1915.

Another patent was issued to Huff on Sep. 16, 1924 as U.S. Pat. No. 1,508,601. Yet another U.S. Pat. No. 2,187,021 was issued to Everson on Jan. 16, 1940 and still yet another was issued on Jul. 9, 1963 to Ollstein as U.S. Pat. No. 3,096,741.

Another patent was issued to Coulboum on Apr. 1, 1975 as U.S. Pat. No. 3,874,339. Yet another U.S. Pat. No. 4,091,766 was issued to Colliard on May 30, 1978. Another was issued to Moeller on Mar. 30, 1982 as U.S. Pat. No. 4,321,891 and still yet another was issued on Sep. 10, 1985 to Workman as U.S. Pat. No. 5,539,937.

Another patent was issued to Kirtley on Nov. 29, 1988 as U.S. Pat. No. 4,787,340. Yet another U.S. Pat. No. 5,467,743 was issued to Doose on Nov. 21, 1995. Another was issued to Keller on Aug. 27, 2002 as U.S. Pat. No. 6,439,167. Another U.S. Patent Application No. 2002/69835 was published on Jun. 13, 2002 to Strahm. Another was issued to Herbst on Aug. 22, 2002 as WIPO Publication WO 02/63949 and still yet another was issued on Sep. 19, 1942 to Tharalsen as U.K. Patent No. GB624,625.

U.S. Pat. No. 1,129,093

Inventor: Amos Hiatt

Issued: Feb. 23, 1915

In a cattle tie, the combination with a rigid, elongated outwardly bowed plate adapted to fit upon the back of the animal's neck, said plate having parallel side edges, a concave forward edge adapted to lie at the base of the animal's head, and a convex rear edge adapted to bear at the base of the animal's neck and means for securing the plate in position upon the neck of the animal.

U.S. Pat. No. 1,508,601

Inventor: George Huff

Issued: Sep. 16, 1924

A harness for dogs comprising a collar, a saddle; and a leash line connected to said collar and saddle.

U.S. Pat. No. 2,187,021

Inventor: John L. Everson

Issued: Jan. 16, 1940

An animal leash harness comprising a single strap of flexible material shaped on an animal to form collar and body loops extending from a common lower point of the loops and relatively free at their tops, and a buckle means releasably securing the strap ends together at the top of a said loop and providing a leash connection thereat.

U.S. Pat. No. 3,096,741

Inventor: Lea J. Ollstein

Issued: Jul. 9, 1963

A collar and leash construction, comprising an elongated flexible flat body formed of triple braided cord terminating in a small loop at one end and a large handle loop at the other end, a sorter flexible flat body formed of quadruple braided cord terminating in loops at opposite ends, quick detachable clamping means connecting said small loop and a portion of the shorter body located between the ends thereof, a first leather strap having a loop engaged with one of the end loops of the shorter body, a second leather strap having a loop engaged with the other end loop of the shorter body, and a buckle on the second strap engageable with the first strap, the cord of the braids being formed with an outer woven fabric tube and a twisted inner fibrous core, said shorter body being wider than the elongated body, said shorter body being elastic longitudinally and laterally.

U.S. Pat. No. 3,874,339

Inventor: John Coulbourn

Issued: Apr. 1, 1975

A collar and leash construction, comprising an elongated flexible flat body formed of triple braided cord terminating in a small loop at one end and a large handle loop at the other end, a sorter flexible flat body formed of quadruple braided cord terminating in loops at opposite ends, quick detachable clamping means connecting said small loop and a portion of the shorter body located between the ends thereof, a first leather strap having a loop engaged with one of the end loops of the shorter body, a second leather strap having a loop engaged with the other end loop of the shorter body, and a buckle on the second strap engageable with the first strap, the cord of the braids being formed with an outer woven fabric tube and a twisted inner fibrous core, said shorter body being wider than the elongated body, said shorter body being elastic longitudinally and laterally.

U.S. Pat. No. 4,091,766

Inventor: Lynette K. Collaird

Issued: May 30, 1978

A pet collar includes a neck embracing member having a tubular configuration and flexible characteristics facilitating the operable disposition of the collar around the neck of an animal. A reflective strip, insertable into the tubular member, has a reflective surface which faces outwardly through a translucent sidewall of the embracing member. Light passing through the translucent sidewall of the embracing member is reflected by the reflective strip to signal the presence of the animal. An identification card can also be disposed interiorly of the tubular embracing member to provide means for identifying the animal. A strip having characteristics for absorbing liquids is adhered to the outer surface of the tubular member for operable disposition in contact with the neck of the animal. The liquid impregnating the absorbent strip can either be an insecticide for inhibiting insect infestation, or a perfume for inhibiting animal odor. The invention also includes a preferred method for constructing the pet collar.

U.S. Pat. No. 4,321,891

Inventor: Romane G. Moeller

Issued: Mar. 30, 1982

An adjustable animal collar comprises a strap formed of an elongated strip of generally continuous material, the strap including holes therein located in spaced apart fashion along the length thereof, one end of the strap being connected to a hollow link member and the opposite end to a hollow buckle. A fastener attached to the buckle is capable of extending through any of the holes in the strap so as to prevent sliding movement of the strap as it extends through the hollow area within the buckle. The strap, proceeding from its end which is attached to the hollow link member, extends through the hollow area defined within the hollow buckle, back through the hollow area defined within the hollow link member, and finally back to its end which is attached to the hollow buckle.

U.S. Pat. No. 4,539,937

Inventor: Edd Workman

Issued: Sep. 10, 1985

A controlled shock animal training device is shown which includes a mounting collar for mounting the device about a portion of the animal's body. The strap has a pair of electrical contacts which are spaced apart on the mounting strap. An electrical circuit, carried on the mounting strap, connects the pair of spaced electrical contacts and provides a controlled voltage output through the contacts upon triggering of an electrical switch within the circuit. A foldable flap formed in the collar interrupts the electrical circuit during installation of the collar. The shock provided is of limited duration and controlled intensity and requires that the electrical switch be opened and then reclosed to repeat the shocking operation.

U.S. Pat. No. 4,787,340

Inventor: Douglas A. Kirtley

Issued: Nov. 29, 1988

An animal collar and leash for use in securing an animal which can easily be adjusted to meet animal size. The animal collar and leash are easily attached to an animal and easily removed.

U.S. Pat. No. 5,467,743

Inventor: Karen A. Doose

Issued: Nov. 21, 1995

A pet collar including first and second flexible belt segments of terminal length adapted to pass around the neck of the pet and form an encircling loop thereabout, an interlocking device attached to the other ends of the belt segments to connect the segments together in end-to-end fashion, a pocket formed in one segment and, a bib connectable to the pocket for depending from the collar.

U.S. Pat. No. 6,439,167

Inventor: Nadine Keller

Issued: Aug. 27, 2002

A collar for use with a pet containment system is provided. The collar includes an inner collar portion having at least one hole passing therethrough and a radio unit attached to the inner collar portion proximate to the hole. The radio unit includes at least one probe protruding therefrom which passes through the hole. The collar also includes an outer cover portion having two ends, one of which is fixedly attached to the inner collar portion on one side of the hole and the other of which defines a free end. The collar further includes a detachable fastening system detachably attaching the free end of the outer cover portion to the inner collar portion on the side of the hole opposite to the side to which the outer cover portion is fixedly attached such that the outer cover portion covers the radio unit, while providing quick and easy access thereto.

U.S. Patent Application Publication 2002/69835

Inventor: Frederick W. Strahm

Issued: Jun. 13, 2002

A collar for use with a pet containment system is provided. The collar includes an inner collar portion having at least one hole passing therethrough and a radio unit attached to the inner collar portion proximate to the hole. The radio unit includes at least one probe protruding therefrom which passes through the hole. The collar also includes an outer cover portion having two ends, one of which is fixedly attached to the inner collar portion on one side of the hole and the other of which defines a free end. The collar further includes a detachable fastening system detachably attaching the free end of the outer cover portion to the inner collar portion on the side of the hole opposite to the side to which the outer cover portion is fixedly attached such that the outer cover portion covers the radio unit, while providing quick and easy access thereto.

WIPO Publication No. WO/02/0639949

Inventor: Hans Herbst

Issued: Aug. 22, 2002

The invention relates to a dog collar comprising a link chain whose length is at least the same as the size of the neck of a dog, said link chain preferably consisting of a plurality of identically constructed chain links and having a ring on both ends, wherein at least one of both rings, namely the ring on the neck side, has an inner diameter whose size is bigger than the biggest cross-sectional dimension of the link chain so that it can slide through the ring on the neck side. The dog collar also has closing means assigned to said ring on the neck side, the closing means interlocking with the individual chain links. The position of the chain links to which the closing means are connected yields relative to the ring on the neck side so that the maximum length of a loop encompassing the neck of a dog is fixed.

U.K. Patent No. GB624,625

Inventor: Sverre Tharalsen

Issued: Sep. 19, 1942

A dog collar comprises an elastic core of circular cross-section surrounded by a sheath of leather or the like. The core may consist of wire string. One end of the collar bears an eye through which a ring on the other end may be passed by turning it edgeways.

While these collars may be suitable for the purposes for which they were designed, they would not be as suitable for the purposes of the present invention, as hereinafter described.

SUMMARY OF THE PRESENT INVENTION

The present invention discloses a collar incorporating various decorative elements used to personalize the collar having means for mounting a behavioral modification apparatus thereto. The collar has at least one aperture for the passage therethrough of the behavioral modification electrode(s) along with means for releasably securing the behavioral apparatus whereby the user can vary or replace the collar. While the collar is designed to incorporate a receptacle for known behavioral modification apparatuses, it can also be used for various other products without departing from the concept of providing a receptacle for the placement therein of a behavioral modification apparatus with apertures for the positioning of electrodes, the receptacle forming an integral part of a strap having one of a mating closure member positioned on each distal end and a ring-like fastener or mounting accessory elements usually associated with pets such as license, identification and contact information.

A primary object of the present invention is to provide a decorative material strap for the mounting thereon of a behavioral modification apparatus.

Another object of the present invention is to provide a decorative strap having a ring-like fastener for the attachment of tags.

Yet another object of the present invention is to provide a decorative strap fabricated of a flexible material.

Yet another object of the present invention is to provide a decorative strap having a receptacle for the mounting therein of a behavioral modification apparatus.

Still yet another object of the present invention is to provide a decorative strap wherein said receptacle has at least one aperture for the passage therethrough of electrodes.

Another object of the present invention is to provide a decorative strap having means for closure comprising slidably engaging locking elements.

Yet another object of the present invention is to provide a decorative strap having various decorative elements incorporated into the strap design including color and pattern.

Another object of the present invention is to provide a decorative strap available in a plurality of sizes and widths.

Still yet another object of the present invention is to provide a decorative strap wherein said receptacle provides rubber grommets for mounting various types of behavioral modification apparatus therein.

Additional objects of the present invention will appear as the description proceeds.

The present invention overcomes the shortcomings of the prior art by providing a collar incorporating various decorative elements used to personalize the collar having means for mounting a behavioral modification apparatus thereto. The collar has at least one aperture for the passage therethrough of the behavioral modification electrode(s) along with means for releasably securing the behavioral apparatus whereby the user can vary or replace the collar.

While the collar is designed to incorporate a receptacle for known behavioral modification apparatus, it can also be used for various other manufacturers without departing from the concept of providing a receptacle for the placement therein of a behavioral modification apparatus with apertures for the positioning of electrodes, said receptacle forming an integral part of a strap having one of a mating closure member positioned on each distal end and a ring-like fastener for mounting accessory elements usually associated with pets such as license, identification and contact information.

The foregoing and other objects and advantages will appear from the description to follow. In the description reference is made to the accompanying drawings, which form a part hereof, and in which is shown by way of illustration-specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
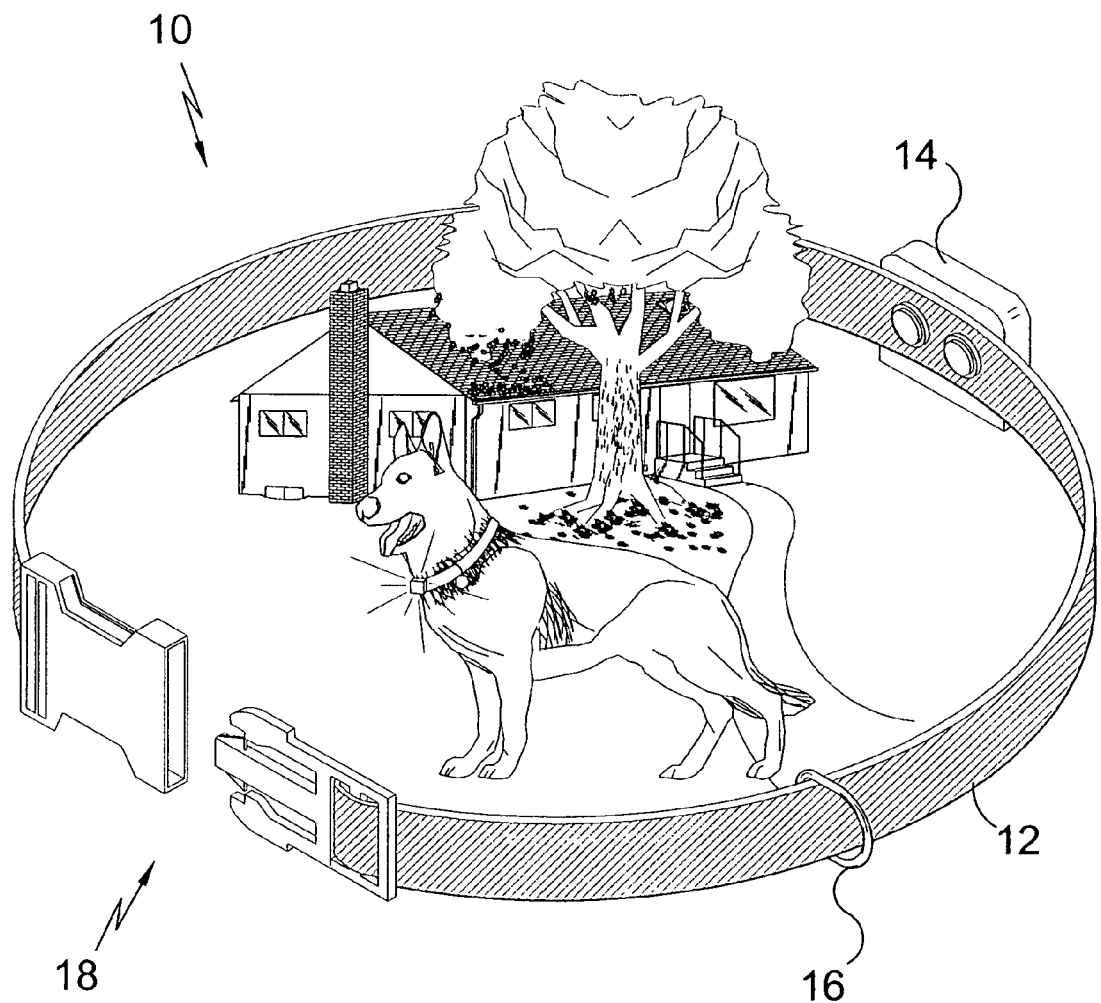
FIG. 1 is an illustrative view of the present invention in use.

With regard to reference numerals used, the following numbering is used throughout the drawings.

10 present invention
12 collar
14 receptacle
16 ring
18 connector
20 tag
22 behavioral modification apparatus
24 pet
26 electrodes
28 rubber grommets
30 apertures

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the present invention 10 in use. Shown is the present invention 10 comprising a pet collar 12 fabricated of a flexible material incorporating decorative elements such as color, pattern, graphic images, indicia, etc., providing variation and personalization of the pet collar. The collar 12 has a receptacle 14 forming an integral part therewith for mounting an electrical stimulus apparatus used in pet behavioral modification, such as perimeter fencing. The receptacle 14 has at least one aperture for the passage therethrough of the apparatus electrode(s) and rubber grommets for releasably securing the apparatus therein. The collar 12 also has a ring-like fastener 16 for the attachment of license, identification and contact information and a quick-release connector 18.

Figure 2:
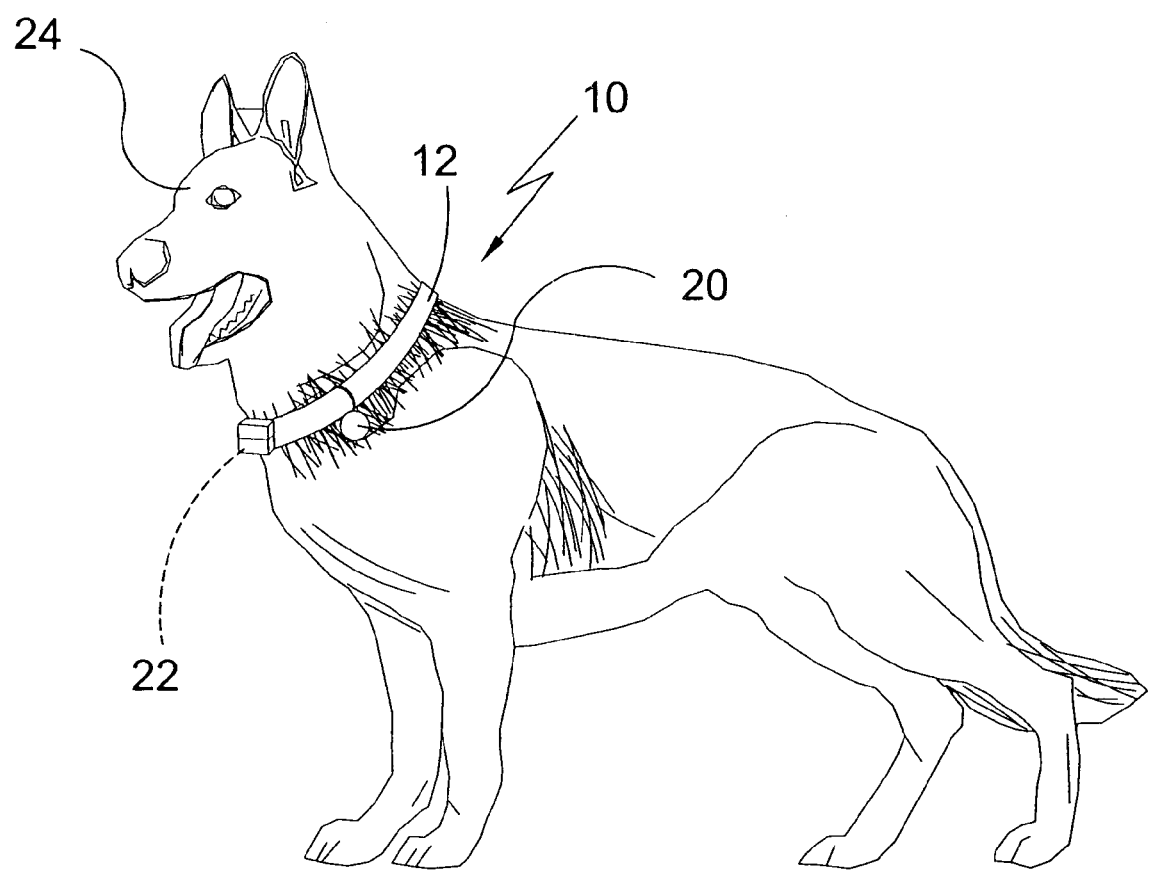
FIG. 2 is an illustrative view of the present invention in use.

Turning to FIG. 2, shown therein is an illustrative view of the present invention 10 in use. Shown is the pet collar 12 of the present invention 10 that incorporates color, pattern, graphic images, indicia, etc. as means for varying and personalizing the pet collar. Also shown is a tag 20 fastened to a ring-like fastener whereby such things as license and contact information can be fastened to the collar 12. The collar 12 has a compartment for mounting an electrical stimulus apparatus 22 used in pet 24 behavioral modification, such as perimeter fencing. The compartment 22 has at least one aperture for the passage therethrough of the apparatus electrode(s) and closure means for releasably securing the apparatus therein.

Figure 3:
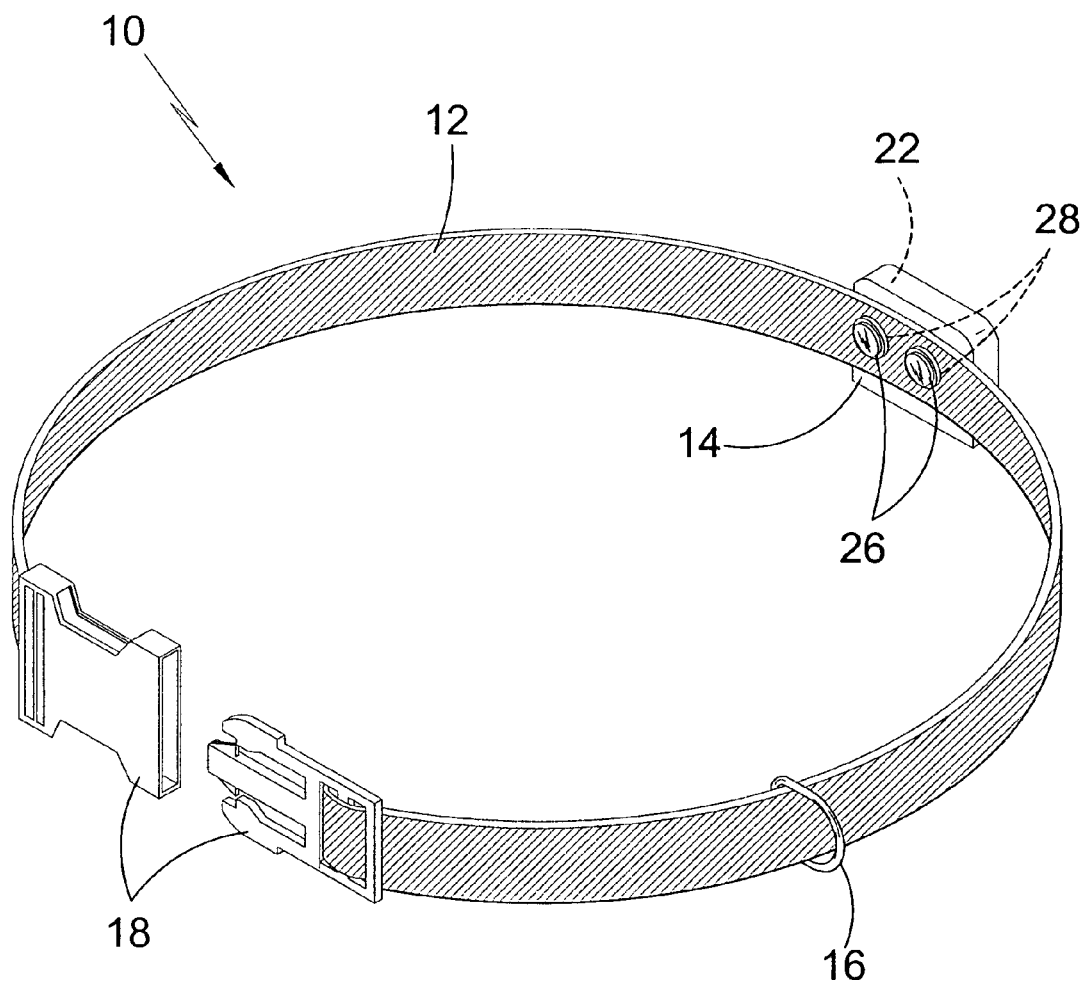
FIG. 3 is a perspective view of the present invention.

Turning to FIG. 3, shown therein is a perspective view of the present invention 10. Shown is the pet collar 12 of the present invention 10 that incorporates color, pattern, graphic images, indicia, etc. as means for varying and personalizing the pet collar. Also shown is a ring-like fastener 16 whereby such things as license and contact information can be fastened to the collar 12. The collar 12 has a receptacle 14 forming an integral part therewith for mounting an electrical stimulus apparatus 22 used in pet behavioral modification, such as perimeter fencing. The receptacle 14 has at least one aperture for the passage therethrough of the apparatus electrode(s) 26 encased in rubber grommets 28 and means for releasably securing the apparatus therein. Also shown is quick-release connector 18.

Figure 4:
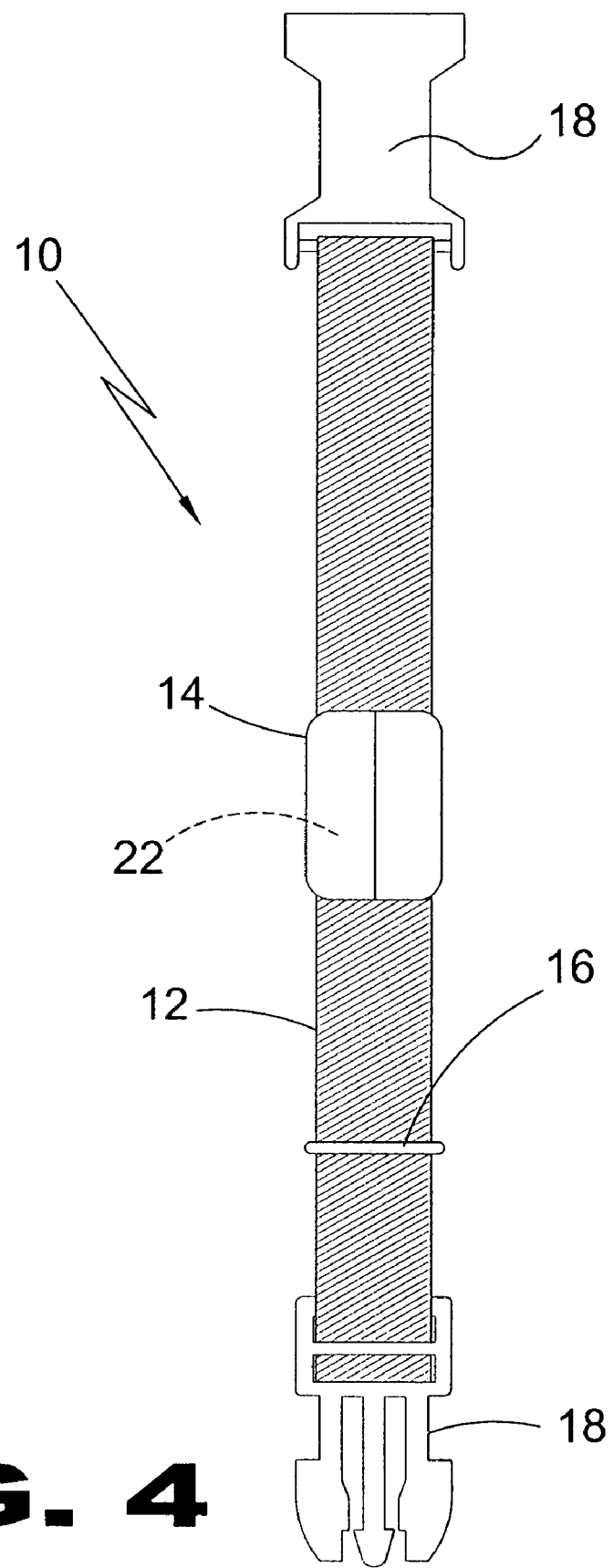
FIG. 4 is a frontal view of the present invention.

Turning to FIG. 4, shown therein is a frontal view of the present invention 10. Shown is a front view of the pet collar 12 of the present invention 10. The strap collar 12 has male/female quick-release connector 18 counterparts, and a receptacle 14 for receiving an electric behavioral modification device 22. The receptacle 14 is formed of an elastomeric rubber grommet for the placement therein of a behavioral modification apparatus 22. The collar 12 also has an identification tag loop 16 for fastening normal pet identification, such as license, identification and contact information. The device 10 is primarily used as an accessory for pet-safe wireless instant fence containment systems, giving the user a choice in material, color, size and design patterns for the collar 12 and may be used for containment of other behavioral modification devices.

Figure 5:
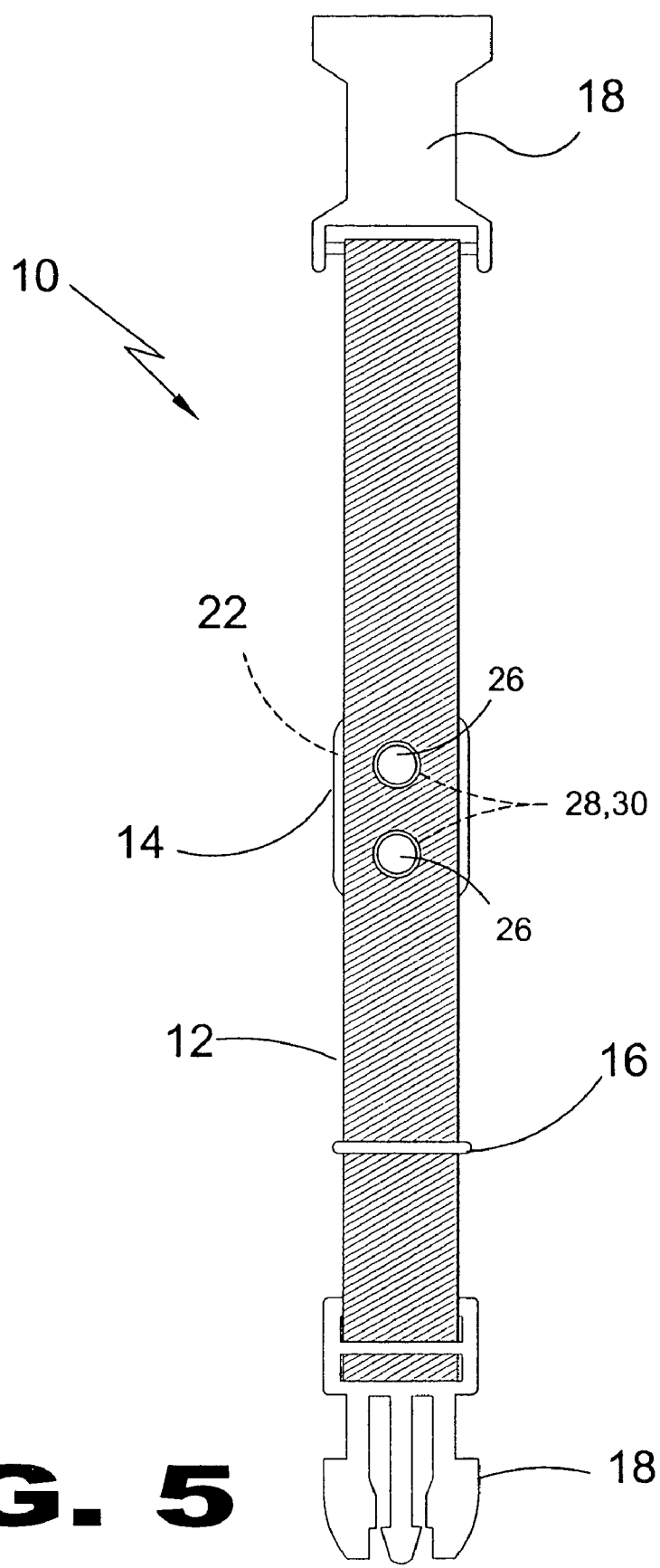
FIG. 5 is a rear view or inside collar view of the present invention.

Turning to FIG. 5, shown therein is a rear view or inside collar view of the present invention 10. Shown is a rear view of the pet collar 12 of the present invention 10 incorporating a strap 12 using color, pattern, graphic images, indicia, etc. as means for varying and personalizing the pet collar. The strap 12 has a quick-release connector 18 male/female counterparts, and a receptacle 14 for receiving an electric behavioral modification device 22. The receptacle 12 has apertures 30 with rubber grommets 28 for the passage of electrical contacts 26. Also provided is an identification tag loop 16. The device 10 is primarily used as an accessory for pet-safe wireless instant fence containment systems, giving the user a choice in material, color, size and design patterns for the collar 12 and may be used for other behavioral modification apparatuses.

Figure 6:
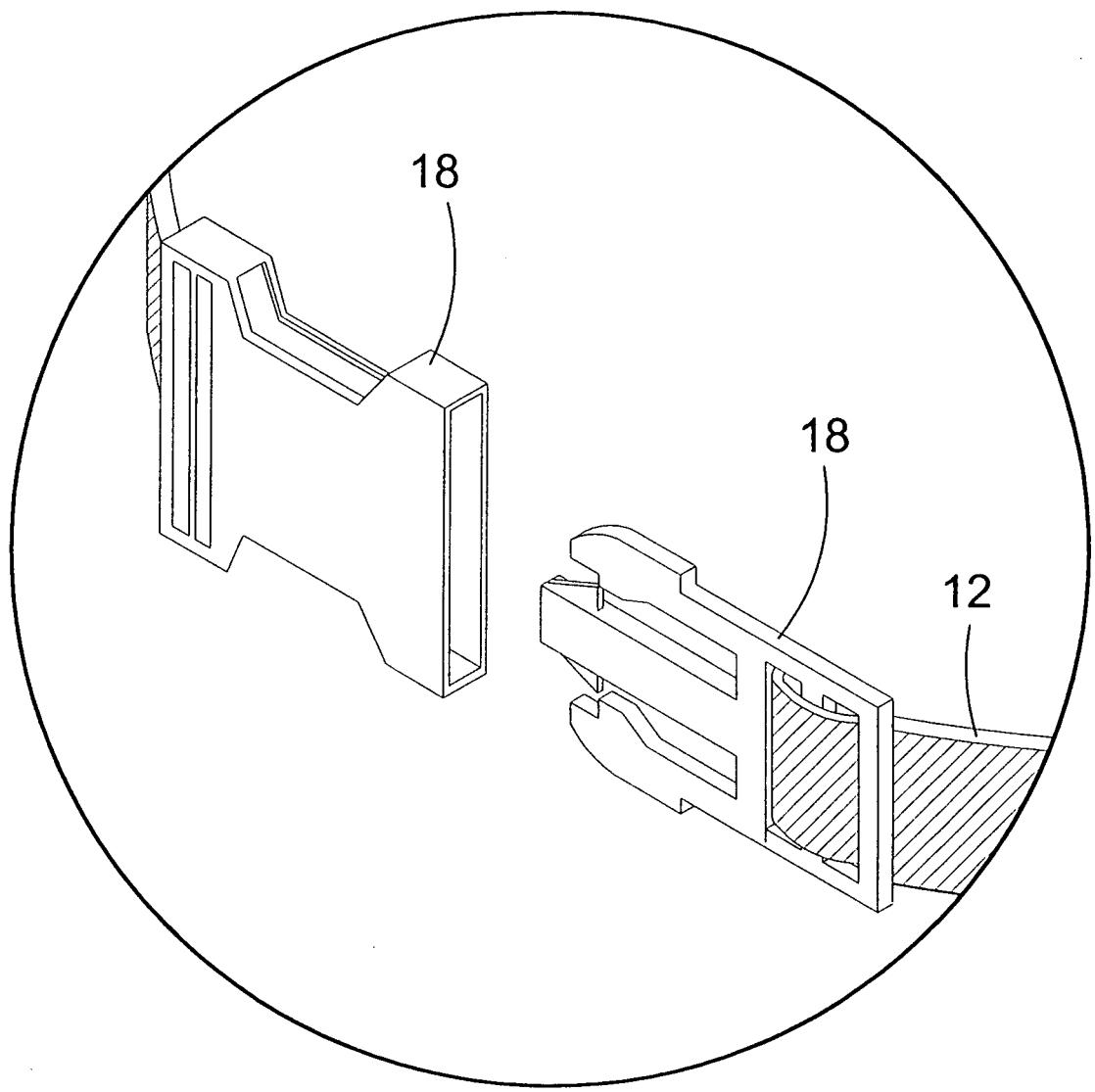
FIG. 6 is a detail view of the quick release of the present invention.

Turning to FIG. 6, shown therein is a detail view of the quick release of the present invention. Shown is a detailed view of the present invention being an adjustable animal collar 12 comprising a nylon strap formed of an elongated strip of nylon material having quick release connector counterparts male/female 18, and a receptacle for receiving an electric behavioral modification device. The receptacle has apertures for the passage of electrically stimulated nodes. Also provided is an identification tag loop. The device is used as an accessory for pet-safe wireless instant fence containment systems, giving the user a choice in material, color, size and design pattern on the collar.

Figure 7:
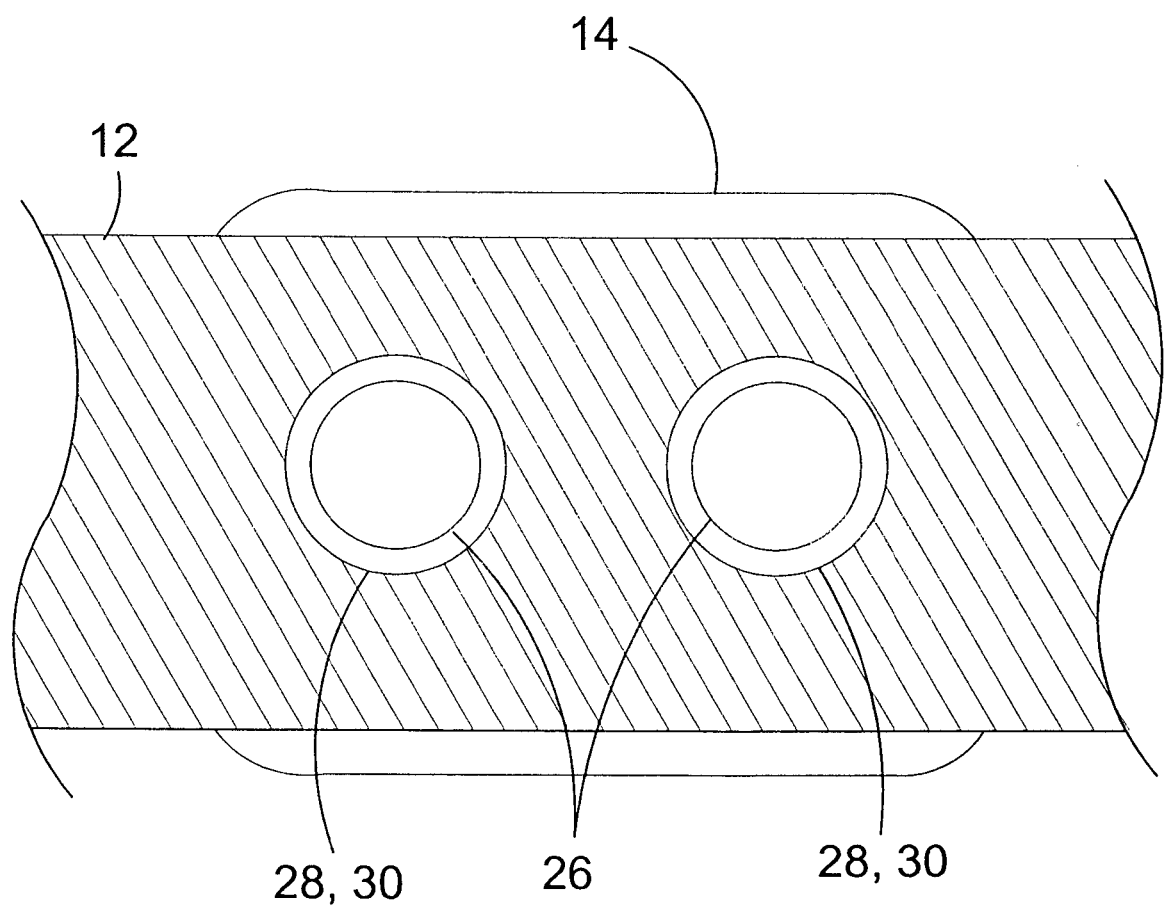
FIG. 7 is an enlarged view of the strap and electrode apertures.

Turning to FIG. 7, shown therein is an enlarged view of the strap and electrode apertures. Shown is the pet collar 12 of the present invention that incorporates color, pattern, graphic images, indicia, etc. as means for varying and personalizing the pet collar. The collar 12 has a compartment or receptacle 14 for mounting an electrical stimulus apparatus used in pet behavioral modification, such as perimeter fencing. The compartment 14 has at least one aperture 30 for the passage therethrough of the apparatus electrode(s) 26 and a rubber grommet 28 for frictionally securing the apparatus therein.

Figure 8:
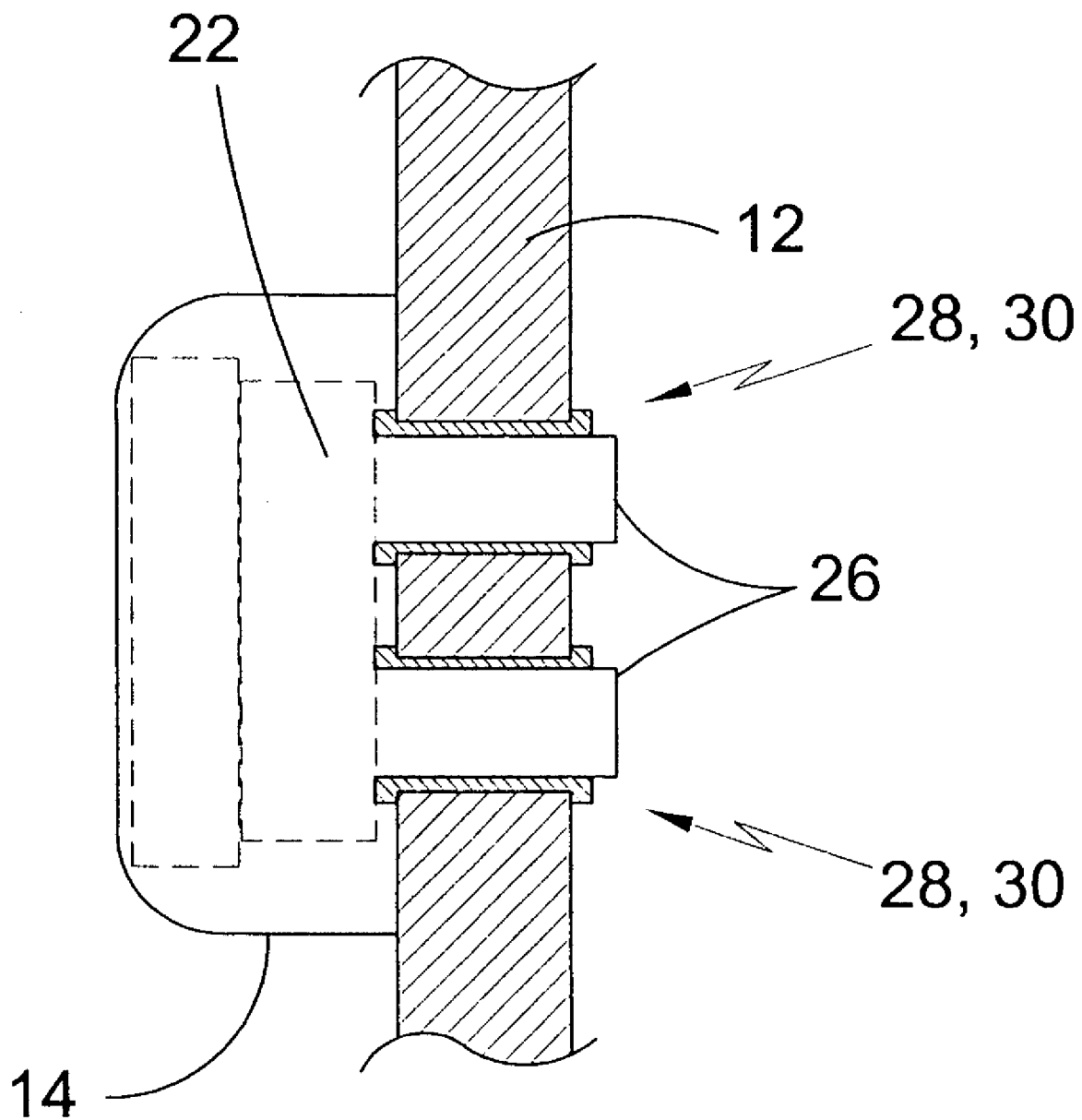
FIG. 8 is a sectional view of the receptacle and behavioral modification device.

Turning to FIG. 8, shown therein is a sectional view of the receptacle and behavioral modification device. Shown is a sectional view of the present invention comprising a pet collar 12 incorporating decorative elements such as color, pattern, graphic images, indicia, etc., that provides variation and personalization of the pet collar. The collar 12 has a receptacle 14 forming an integral part therewith for mounting an electrical stimulus apparatus 22 used in pet behavioral modification, such as perimeter fencing. The receptacle 14 has at least one aperture 30 for the passage therethrough of the apparatus electrode(s) 26 and a rubber grommet 28 for releasably securing the apparatus therein. The collar 12 also has a ring-like fastener for the attachment of license, identification and contact information.

We claim:

1. A decorative collar for a pet consisting of:
b) said collar being elongated and having first and second ends, and inner and outer surfaces having a pair of spaced apertures therein, said apertures passing completely through said collar;
c) a compartment mounted on said outer surface of said collar covering said apertures, said compartment containing said behavioral modification device;
d) a rubber grommet being disposed in each of said apertures and having annular flanges overlapping said apertures on the outer and inner surfaces of said collar, the annular flanges on the outer surface of said collar extending inside of said compartment;
a) a behavioral modification device having a pair of cylindrical electric contacts extending out from said behavioral modification device through said rubber grommets and past said flanges on the inner surface of said collar terminating in distal ends:
e) said distal ends having flat end surfaces adapted to contact a skin surface of the pet wearing said collar; and
f) a quick-release connector for attaching the ends of the collar to each other around the neck of the pet;
g) a ring being disposed on said collar to permit an identification tag to be place thereon.

2. The collar of claim 1, wherein said collar is adjustable in length to fit various sizes of pets.

3. The apparatus of claim 2, wherein said quick-release connector comprises a male component and a female component.

4. The apparatus of claim 3, wherein said compartment is disposed between said first and second ends of said collar.

* * * * *